United States Patent
Huang et al.

(10) Patent No.: US 11,411,625 B2
(45) Date of Patent: *Aug. 9, 2022

(54) TRANSMISSION POWER FOR PARTIAL COHERENT ANTENNAS

(71) Applicant: QUALCOMM Incorporated, San Diego, CA (US)

(72) Inventors: Yi Huang, San Diego, CA (US); Joseph Binamira Soriaga, San Diego, CA (US); Peter Gaal, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,309

(22) Filed: Jun. 21, 2019

(65) Prior Publication Data
US 2019/0393939 A1    Dec. 26, 2019

Related U.S. Application Data

(60) Provisional application No. 62/689,812, filed on Jun. 25, 2018.

(51) Int. Cl.
*H04K 1/10* (2006.01)
*H04L 27/28* (2006.01)
(Continued)

(52) U.S. Cl.
CPC ......... *H04B 7/0473* (2013.01); *H04B 7/0404* (2013.01); *H04W 52/146* (2013.01); *H04W 52/42* (2013.01)

(58) Field of Classification Search
CPC .. H04B 7/0473; H04B 7/0486; H04B 7/0404; H04W 52/42; H04W 52/146; H04L 5/0048
(Continued)

(56) References Cited

U.S. PATENT DOCUMENTS

2008/0039030 A1* 2/2008 Khan ................... H04B 7/0689
455/101
2010/0208838 A1    8/2010 Lee et al.
(Continued)

OTHER PUBLICATIONS

U.S. Appl. No. 16/805,499, filed Feb. 8, 2020.*
(Continued)

*Primary Examiner* — Phuong Phu
(74) *Attorney, Agent, or Firm* — Arent Fox, LLP

(57) ABSTRACT

A method, a computer-readable medium, and an apparatus are provided that enable use of a full transmission power for a UE having a first set of coherent antenna ports that is non-coherent to a second set of coherent antenna ports. The apparatus determines a transmission power for a data transmission from the UE to a base station based at least in part on power control signaling from the base station, determines at least one antenna port having non-zero data for transmission, and determines a transmission power split for the at least one antenna port. Then, the apparatus transmits the data transmission from the at least one antenna port, wherein a combined transmission power from the at least one antenna port corresponds to the transmission power determined based at least in part on the power control signaled from the base station.

17 Claims, 11 Drawing Sheets

(51) Int. Cl.
  *H04B 7/0456* (2017.01)
  *H04W 52/42* (2009.01)
  *H04B 7/0404* (2017.01)
  *H04W 52/14* (2009.01)

(58) Field of Classification Search
  USPC .................................. 375/260, 267, 299
  See application file for complete search history.

(56) References Cited

U.S. PATENT DOCUMENTS

| | | | | |
|---|---|---|---|---|
| 2019/0044681 | A1* | 2/2019 | Zhang | H04L 5/0048 |
| 2019/0312617 | A1* | 10/2019 | Wernersson | H04B 7/0486 |
| 2020/0204230 | A1 | 6/2020 | Huang et al. | |

OTHER PUBLICATIONS

Ericsson: "PUSCH power scaling in UL power control", 3GPP Draft; R1-1807267 PUSCH Power Scaling in UL Power Control, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018, May 20, 2018 (May 20, 2018), XP051442463, 9 pages, Retrieved from the Internet: URL:http://www.3gpp.org/ftp/Meetings%5F3GPP%5FSYNC/RAN1/Docs/ [retrieved on May 20, 2018], pp. 1,2,3,4; tables 1,2.

Huawei et al., "New WI proposal: NR MIMO enhancements", 3GPP Draft; P49 RP-180386 NR MIMO, 3rd Generation Partnership Project (3GPP), Mobile Competence Centre ; 650, Route Des Lucioles ; F-06921 Sophia-Antipolis Cedex; France, vol. TSG RAN, No. Chennai, India; Mar. 19, 2018-Mar. 22, 2018, Mar. 12, 2018 (Mar. 12, 2018), XP05 1509534, 5 Pages, Retrieved from the Internet: URL:http://www.3gpp.org/ftp/tsg%5Fran/TSG%5FRAN/TSGR%5F79/Docs/RP%2D180386%2Ezip [retrieved on Mar. 12, 2018], pp. 2,3.

International Search Report and Written Opinion—PCT/US2019/038733—ISA/EPO—dated Aug. 12, 2019.

Samsung: "Issues on codebook based UL transmission", 3GPP Draft; R1-1806709 Issues on Codebook Based UL Transmission, 3rd Generation Partnership Project (3GPP), Mobile Competence Centre ; 650, Route Des Lucioles ; F-06921 Sophia-Antipolis Cedex; France, vol. RAN WG1, No. Busan, Korea; May 21, 2018-May 25, 2018, May 20, 2018 (May 20, 2018), XP051441911, 5 Pages, Retrieved from the Internet: URL:http://www.3gpp.org/ftp/Meetings%5F3GPP%5FSYNC/RAN1/Docs/ [retrieved on May 20, 2018], pp. 1,2,3.

* cited by examiner

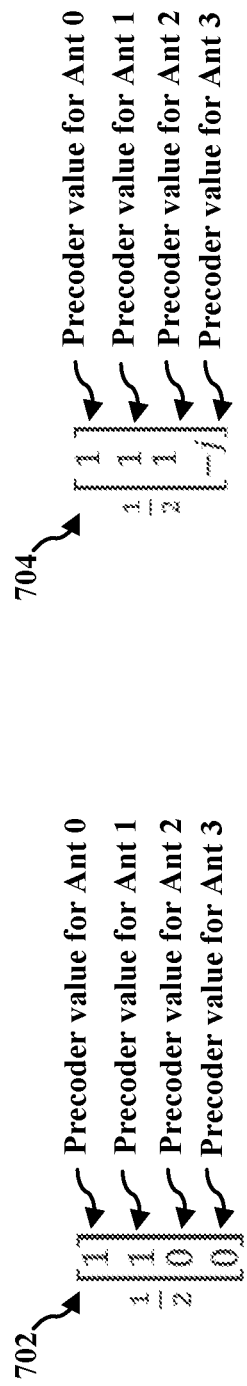
FIG. 7A
FIG. 7B
FIG. 7C
FIG. 7D

TRANSMISSION POWER FOR PARTIAL COHERENT ANTENNAS

CROSS REFERENCE TO RELATED APPLICATION(S)

This application claims the benefit of U.S. Provisional Application Ser. No. 62/689,812, entitled "Transmission Power for Partial Coherent Antennas" and filed on Jun. 25, 2018, which is expressly incorporated by reference herein in its entirety.

BACKGROUND

Technical Field

The present disclosure relates generally to communication systems, and more particularly, to a transmission power for a User Equipment (UE) having partial coherent antennas.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A UE may be configured with a first set of coherent antennas and a second set of coherent antennas, where the first set antennas are non-coherent with the second set of antennas. The partial coherent antennas can lead to challenges for transmissions from the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Limitations may be placed on the transmission power for a UE having partial coherent antennas. Aspects presented herein improve a UE's transmission power control for multiple-input and multiple-output (MIMO) for a UE having partial coherent antennas.

In an aspect of the disclosure, a method, a computer-readable medium, and an apparatus are provided for wireless communication at a UE having a first set of coherent antenna ports that is non-coherent to a second set of coherent antenna ports. The apparatus determines a transmission power for a data transmission from the UE to a base station based at least in part on power control signaling from the base station, determines at least one antenna port having non-zero data for transmission, and determines a split of transmission power for the at least one antenna port. Then, the apparatus transmits the data transmission from the at least one antenna port, wherein a combined transmission power from the at least one antenna port corresponds to the transmission power determined based at least in part on the power control signaled from the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A, 7B, 7C, and 7D illustrate example precoder matrices.

DETAILED DESCRIPTION

Figure 1:
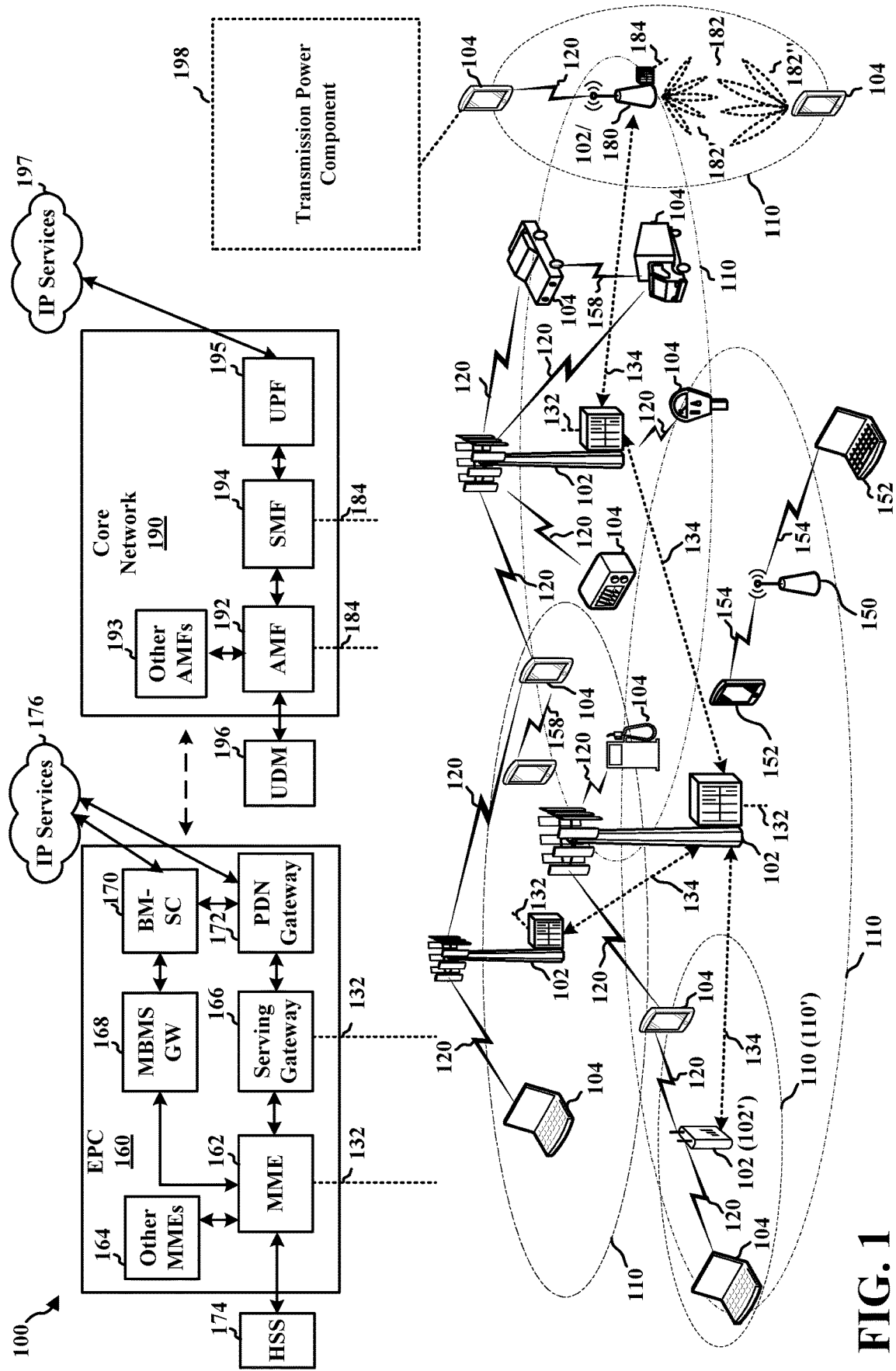
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 having partial coherent antenna ports may comprise a transmission power component 198 configured to determine a transmission power for a data transmission from at least one of the antenna port(s), including aspects described in connection with the examples presented herein. Although the following description may be focused on 5G NR, the concepts described herein may be applicable to other similar areas, such as LTE, LTE-A, CDMA, GSM, and other wireless technologies.

Figure 2:
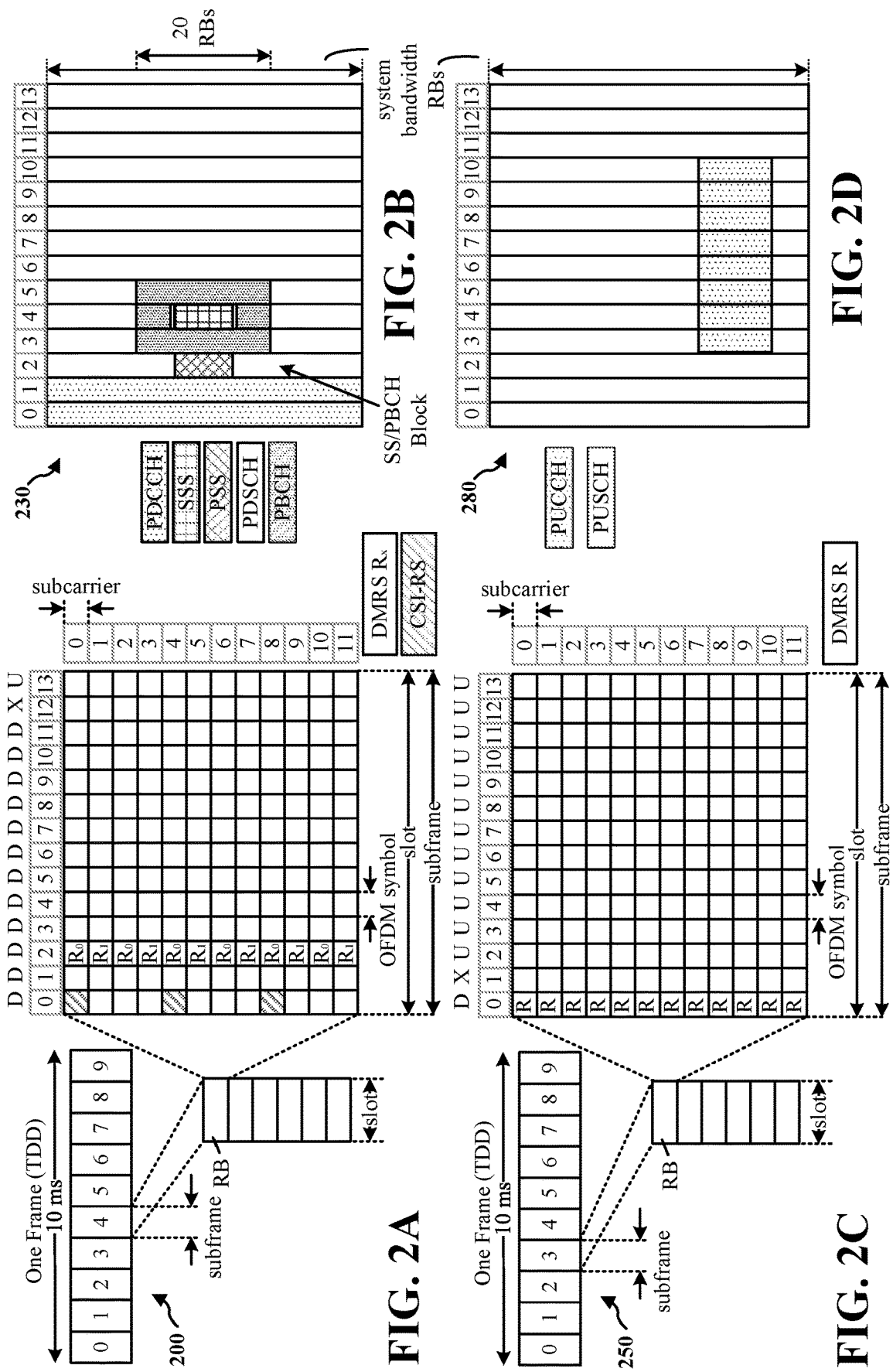
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
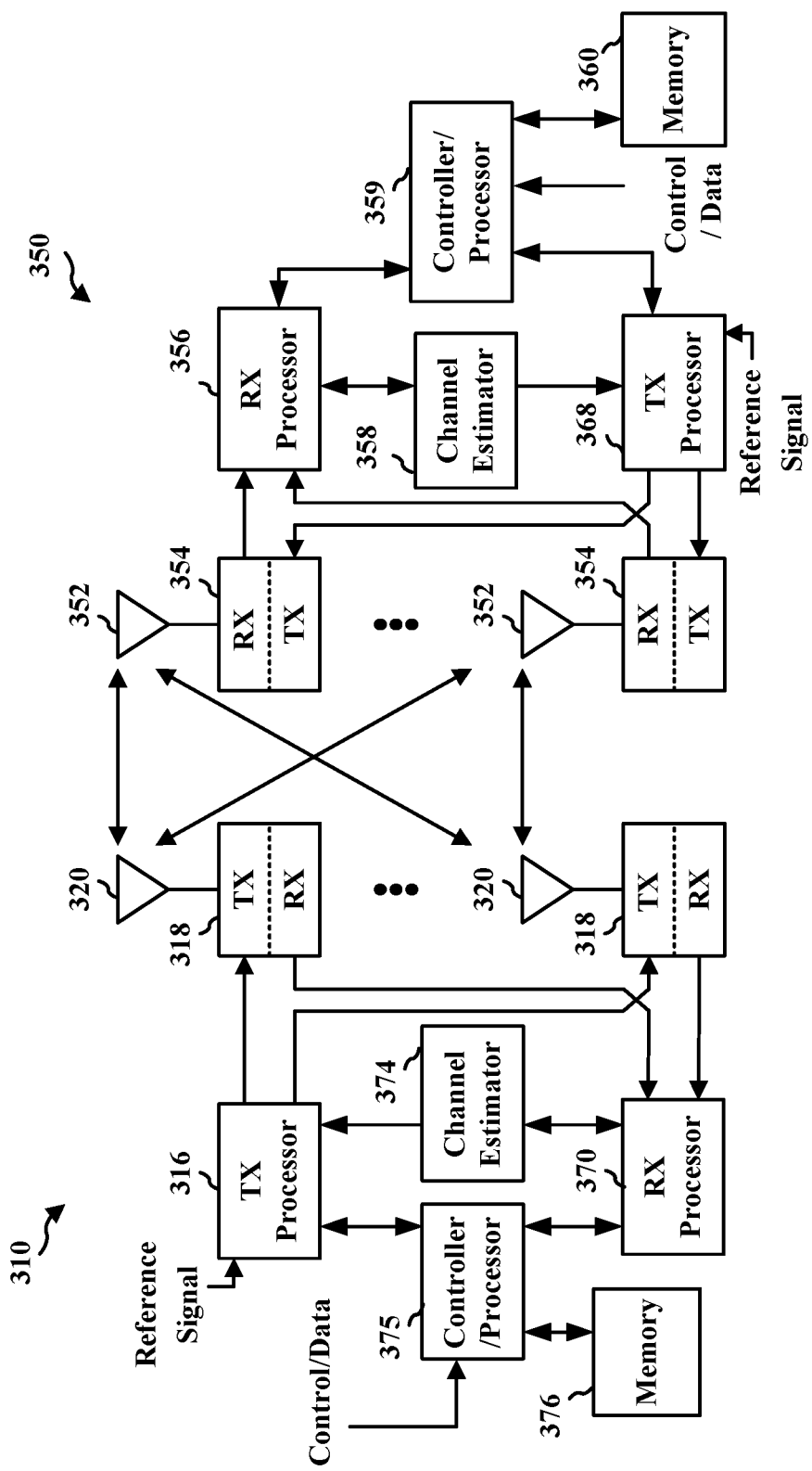
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
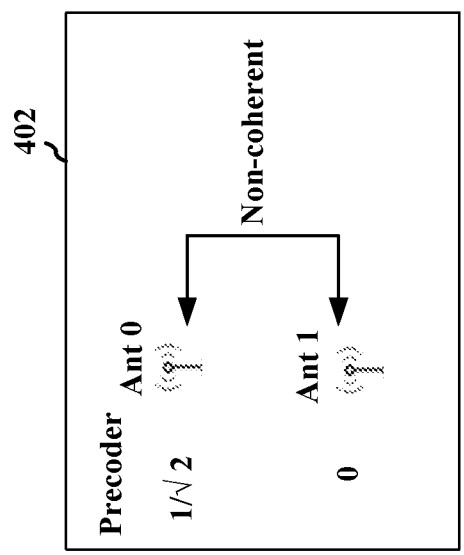
FIG. 4 illustrates an example of a wireless communication device having non-coherent antenna ports.
Figure 5:
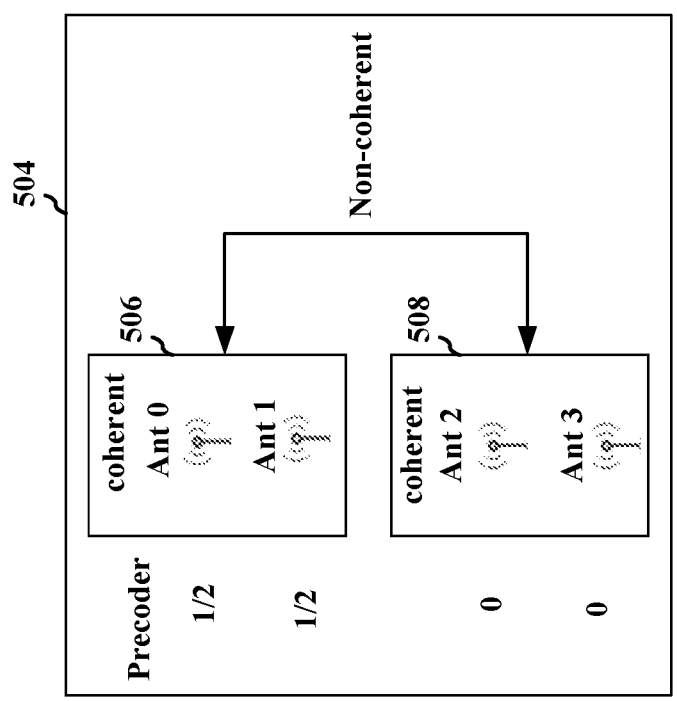
FIG. 5 illustrates an example of a wireless communication device having partial coherent antenna ports.

FIG. 4 illustrates an example of a wireless communication device 402 having non-coherent antennas. In this example, the wireless communication device 402 cannot maintain phase coherence between a first antenna (Ant 0) and a second antenna (Ant 1). The antennas may have different precoder values, as shown. For example, Ant 0 may be associated with a precoder value of $1/\sqrt{2}$ while Ant 1 is associated with a precoder value of 0. FIG. 5 illustrates an example of a wireless communication device 504 having partial coherent antennas. For example, a first set of antennas 506 is coherent. Thus, Ant 0 and Ant 1 in set 506 are capable of maintaining a relative phase difference between each other over time. Similarly, a second set of antennas 508 is coherent, with Ant 2 and Ant 3 being capable of maintaining a relative phase difference between each other over time. However, the first set of coherent antennas 506 is non-coherent to the second set of coherent antennas 508. For example, the wireless communication device 504 cannot maintain phase coherence between Ant 0 in set 506 and Ant 2 in set 508, and similarly cannot maintain phase coherence between Ant 1 in set 506 and Ant 3 in set 508. In other words, the wireless communication device can maintain phase coherence between antennas included in each of two antenna groups (e.g., first antenna set 506 and second antenna set 508), but cannot maintain phase coherence between the two antenna groups. Therefore, the wireless communication device 504 may be described as being capable of achieving partial coherence among antenna ports of the wireless communication device or as having partial coherent antennas. The non-coherent antenna sets may be associated with different precoder values, as shown in FIG. 5. For example, Ant 0 and Ant 1 in the first coherent set 506 may be associated with a precoder value of ½ while Ant 2 and Ant 3 in the second coherent set 508 may be associated with a precoder value of 0. The number of antennas shown in FIGS. 4 and 5 are merely examples, a wireless communication device may include any number of sets of coherent antennas that are non-coherent with each other, whereas FIG. 5 only illustrates two sets of coherent antennas. Further, each coherent set may include any number of coherent antennas.

In some wireless networks (e.g., an LTE network), a wireless communication device may be assumed to be capable of achieving full coherence. In such a case, a MIMO scheme, associated transmitting a signal using the multiple antennas of the wireless communication device, may be designed under the assumption of full coherence. Wireless communication (e.g., a 5G/NR communication) involving partial coherence may have unique challenges for MIMO communication. For example, limitations may be placed on transmission power for a UE with partial coherent antennas that restrict the UE from transmitting with full transmit power. A UE may determine a transmit power for data transmission, e.g., for transmitting PUSCH, based on uplink power control signaling received from the base station. The transmit power is a power level without power scaling by the UE to reduce the transmit power. For example, uplink power control may determine the average power over an OFDM symbol in which the physical channel is transmitted by the UE.

As part of power control at the UE, the UE may further scale the transmit power that it determined based on the power control signaling from the base station. The UE may first scale the determined transmit power by the ratio of the number of antenna ports with a non-zero PUSCH transmission to the number of configured antenna ports for the transmission scheme. The resulting scaled power may then be split equally across the antenna ports on which the non-zero PUSCH is transmitted. For example, the wireless communication device 504 in FIG. 5 is illustrated as having four configured antenna ports (Ant 0, Ant 1, Ant 2, Ant 3), two of the four antenna ports having non-zero PUSCH (Ant 0, Ant 1). When the wireless communication device determines a transmit power of P based on power control signaling from a base station, the transmit power P would be scaled by the ratio of 2 to 4, e.g., ½. Then, the scaled transmit power, P/2, would be split evenly between Ant 0 and Ant 1. Therefore, the two antenna ports, Ant 0 and Ant 1, would each transmit the PUSCH with a transmit power of P/4. The actual transmit power used by the UE would total (P/4+P/4=P/2).

Figure 6A:
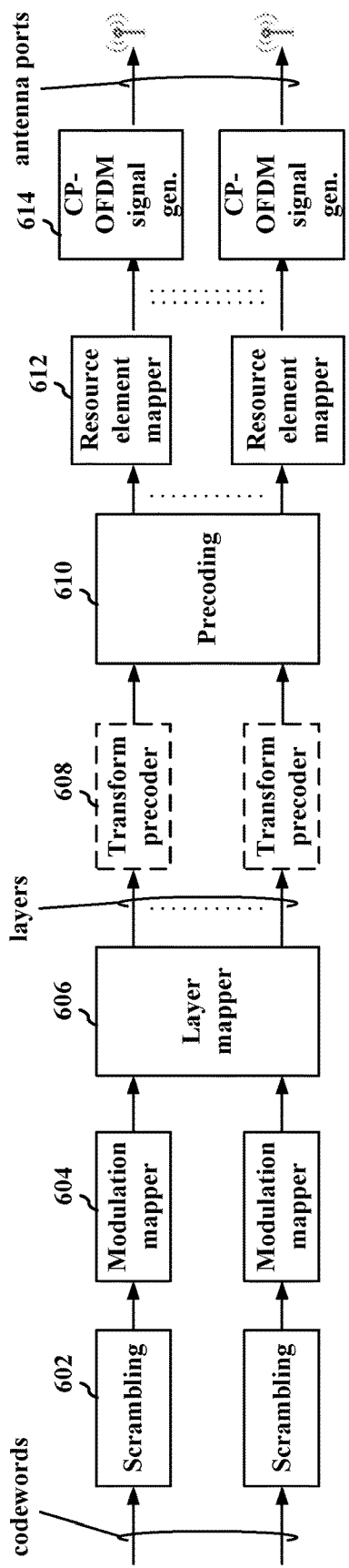
FIGS. 6A and 6B illustrate example aspects of generating a data transmission.

FIG. 6A illustrates an example of aspects that may be employed in uplink physical channel processing at a UE. A baseband signal representing the PUSCH may be generated by scrambling 602, modulation 604 of scrambled bits to generate complex-valued symbols, mapping 606 of the complex-valued modulation symbols onto one or more transmission layers, precoding 610 of the one or more layers of the complex-valued symbols, mapping 612 of precoded complex-valued symbols to resource elements, and generation 614 of complex-valued time-domain Cyclic Prefix Orthogonal Frequency Division Multiplexing (CP-OFDM) signal for each antenna port. In another example, the uplink transmission may be based on Discrete Fourier Transform-spread-OFDM (DFT-s-OFDM), in which a transform precoder may be applied after the layer mapper 606 and prior to the precoding 610 on each layer. Thus, the transform precoder 608 may be enabled or disabled based on the signal being generated. For precoding 610, a precoder may receive input from a layer mapper 606 and generate a block of vectors to be mapped onto resource elements. Precoding 610 may be performed for spatial multiplexing, e.g., based on the layers onto which the codewords are mapped as part of layer mapping. Precoding 610 for spatial multiplexing may be based on a precoding matrix. The precoding matrix may be given by a table entry or a codebook. A matrix may be selected by the UE based on a number of antenna ports, a codebook index, a number of mapped layers, etc. A MIMO codebook may take into account sets of non-coherent antenna ports and may provide one set of antenna ports with a non-zero precoder value. The other antenna port set(s) may have a zero precoder value. Thus, the codebook prevents simultaneous transmission of the PUSCH from non-coherent antennas. FIG. 7A illustrates an example codebook matrix 702 that prevents such simultaneous transmission between the non-coherent antenna ports in the example of FIG. 5. In FIG. 7A, Ant 2 and Ant 3 will have a precoder value of 0 and will not transmit PUSCH, while Ant 0 and Ant 1 will have a non-zero precoder value of ½ for the PUSCH transmission. Similarly, the matrix 706 in FIG. 7C gives Ant 2 and Ant 3 a precoder value of 0, while Ant 0 and Ant 1 have a non-zero precoder value for the PUSCH transmission. Thus, the matrices in FIGS. 7A and 7C avoid simultaneous transmission from the non-coherent antenna sets.

Aspects presented herein provide ways in which the transmission power of the UE can be utilized more effectively. In one example, the UE may use its potential transmission power more effectively through changes in the way that the UE performs power control. In another example, the UE may use its potential transmission power more effectively through an adjusted codebook design and/or diversity scheme.

Figure 8:
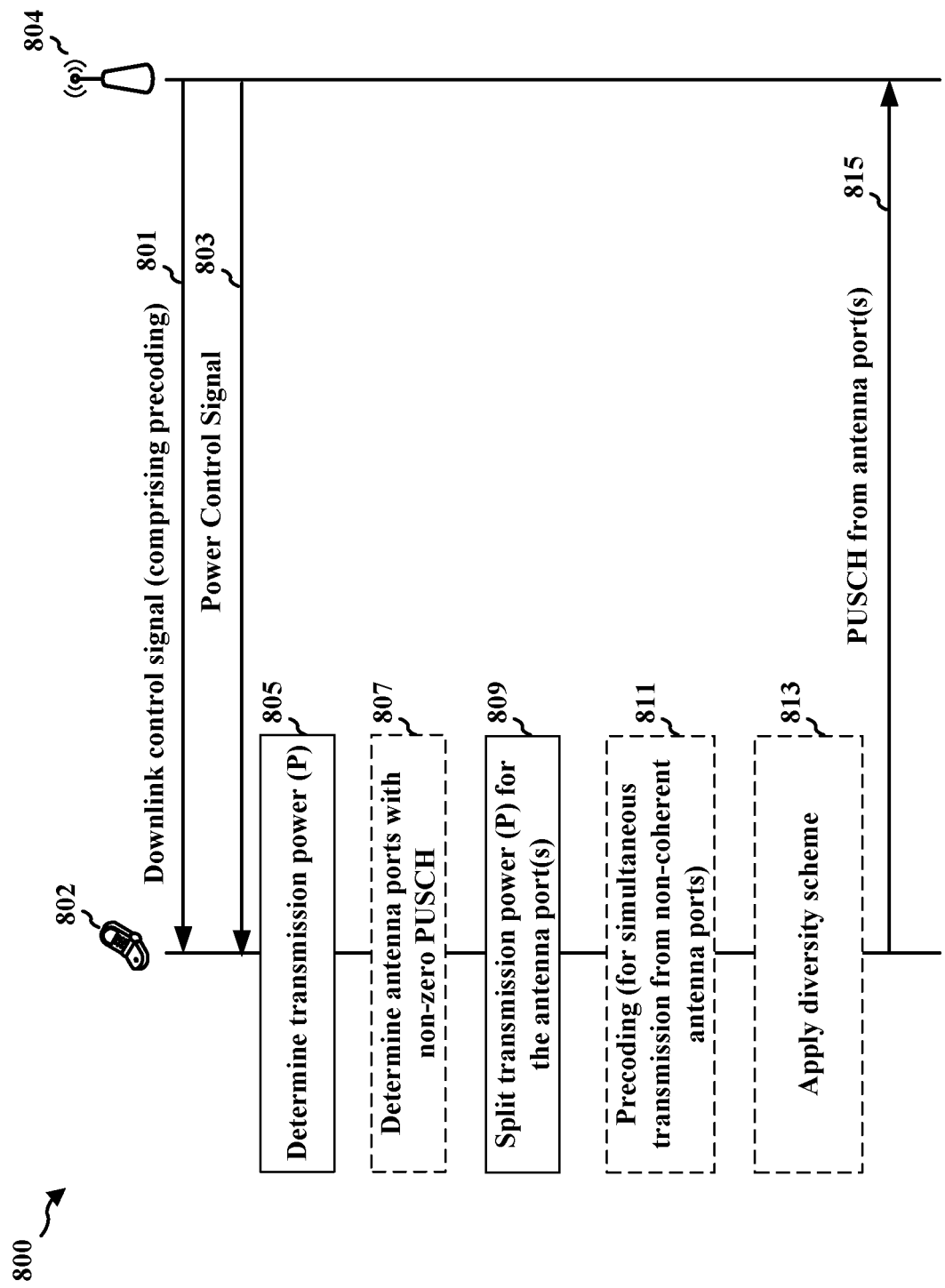
FIG. 8 is an example communication flow between a UE and a base station.

FIG. 8 illustrates an example communication flow 800 between a UE 802 and a base station 804 that may involve aspects for improving transmission power at the UE. The UE 802 may comprise non-coherent antenna ports, e.g., as described in connection with FIG. 4, or partial coherent antenna ports, e.g., as described in connection with FIG. 5. The UE 802 may receive a power control signal 803 from the base station. Based on information received in the power control signal 803, the UE may determine a transmit power, P, at 805. The transmit power, P, may be determined by the UE, at 805, to be a minimum of a maximum power that the UE can transmit, e.g. $P_{max}$, and a second transmission power scheduled by the base station, e.g., $P_{schedule}$, via power control signaling. This determination may be expressed as, e.g., P=min $\{P_{max}, P_{schedule}\}$.

In the first example, the UE may use a codebook that avoids simultaneous transmission from non-coherent antenna ports. Thus, in the example illustrated in FIG. 5, the UE may use a codebook that limits non-zero PUSCH transmission to either the first coherent antenna set 506 or the second coherent antenna set 508, but that does not provide for simultaneous, non-zero PUSCH transmission from both sets of antennas that are non-coherent with each other. Thus, the UE may apply a codebook with matrix values similar to the example matrix 702, 706 in FIGS. 7A and 7C. The UE may split a non-scaled transmit power, e.g., P, across the antenna ports on which the non-zero PUSCH is transmitted, at 809. In the example of FIG. 5, the transmit power per antenna port would be P/2 for Ant 0 and P/2 for Ant 1. Thus, the total transmit power (P/2+P/2) for the antenna ports having a non-zero PUSCH transmission would be equal to the full transmit power P, e.g., the full transmit power determined by the UE based on the power control signaling from the base station. Similarly, for the example in FIG. 1, with a non-zero precoder applied to Ant 0 and a zero precoder applied to Ant 1, the transmit power for Ant 0 would be P/1=P. Thus, the total actual transmit power by the UE is P, the full, determined transmit power, e.g., without scaling by the ratio of the number of antenna ports with a non-zero PUSCH transmission to the number of configured antenna ports for the transmission scheme.

In the second example, the UE may improve the use of its transmission power through simultaneous transmission of data using non-coherent antennas. The UE may use a different transmit scheme that enables non-coherent antenna sets to transmit PUSCH simultaneously. For example, the UE may use a MIMO codebook, at 811, that provides non-zero values for antennas that are non-coherent with each other, e.g., antenna(s) in a first set that is non-coherent with antenna(s) in a second set. FIGS. 7B and 7D illustrate example matrixes that provide non-zero values for simultaneous transmission between the non-coherent antennas in the example of FIG. 5. The four antennas of FIG. 5 will simultaneously transmit PUSCH using the matrix in either FIG. 7B or 7D. The UE may split the transmission power among the antenna ports, as illustrated at 809. By using all four antennas to transmit the PUSCH, the transmit power may be split evenly among the 4 antennas, with each antenna port transmitting the PUSCH using a power P/4. Therefore, the total transmit power actually used for the transmission at the four antenna ports (e.g., P/4+P/4+P/4+P/4) will be equal to the full transmit power, P, determined by the UE at 805 based on the power control signaling from the base station. Similarly, for the example in FIG. 4, the UE may transmit using both Ant 0 and Ant 1, with each antenna port using a transmission power of P/2.

Figure 6B:
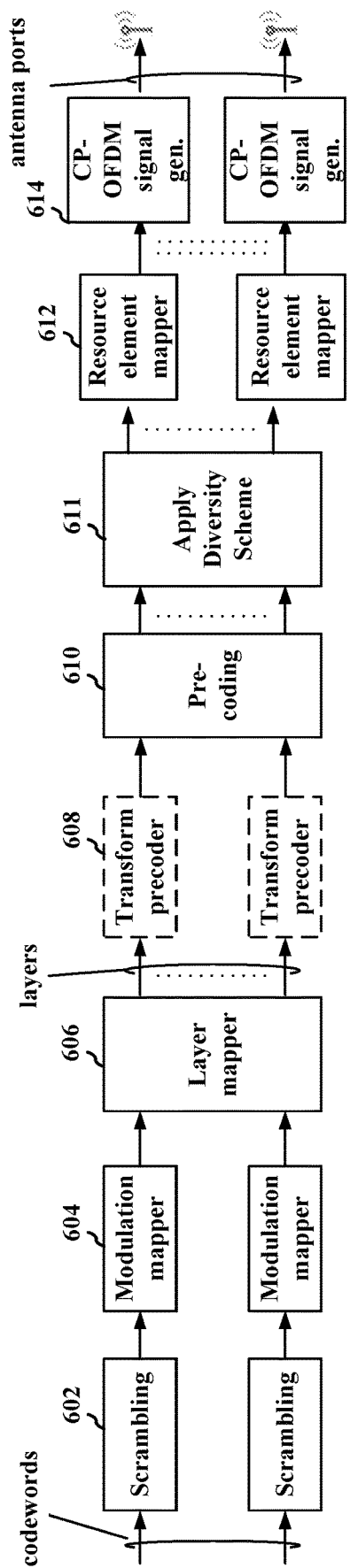

As the relative phase difference between the non-coherent antenna sets may vary, the UE may apply a diversity scheme among the non-coherent sets of antennas, at 813. FIG. 6B illustrates an example that may be employed at a UE to generate a baseband signal representing PUSCH. In FIG. 6B, the UE may apply a diversity scheme at 611. While the diversity scheme is illustrated after precoding 610, the diversity scheme may also be applied prior to precoding, in other examples. In the example in FIG. 5, the diversity scheme would be applied among the first antenna set 506 and the second antenna set 508. In another example, the UE may apply an open-loop, non-transparent diversity scheme among the first antenna set 506 and the second antenna set 508. Among other examples, an open-loop, non-transparent MIMO scheme may include an open-loop diversity scheme that uses space frequency block coding (SFBC), space-time block coding (STBC), etc.

In an example when the UE is to transmit data bits $x_0$ and $x_1$ (e.g., $[x_0, x_1]$) on a first frequency tone (e.g., tone 0) and a second frequency tone (e.g., tone 1), Table 1 illustrates an example of SFBC across antenna sets 506, 508 from FIG. 5.

TABLE 1

| SFBC | Tone 0 | Tone 1 |
|---|---|---|
| Ant 0 | $x_0$ | $x_1$ |
| Ant 1 | $x_0$ | $x_1$ |
| Ant 2 | $x_1^*$ | $x_0^*$ |
| Ant 3 | $x_1^*$ | $x_0^*$ |

In this example, $x_1^*$ indicates a complex conjugate of data bit $x_1$, and $x_0^*$ indicates a complex conjugate of data bit $x_0$. The UE may apply precoding before or after applying the SFBC diversity scheme. Similar to this SFBC example, the diversity scheme may involve STBC. As an example, STBC may comprise similar aspects applied for frequency Tone 0 and frequency Tone 1 in SFBC being applied to OFDM symbol 0 and OFDM symbol 1. Thus, SFBC maps data symbols $x_0$ and $x_1$ into two frequency tones, whereas STBC would map the two data symbols $x_0$ and $x_1$ into two OFDM symbols.

In another example, the UE may apply a transparent diversity scheme. Among other examples, a transparent MIMO scheme may include small delay Cyclic Delay Diversity (CDD), etc. The transparent diversity scheme may be applied across antenna sets where phase coherence cannot be maintained. For a data stream $x_0, x_1, x_2, \ldots$, and the two antenna groups 506, 508 illustrated in FIG. 5, the UE may apply a precoder matrix $$\begin{bmatrix} g0 \\ g1 \\ g2 \\ g3 \end{bmatrix}$$

and apply small delay CDD to antenna set 2 508, e.g., Ant 2 and Ant 3. The precoder matrix and small diversity scheme may be performed in any order, e.g., with the precoding applied prior to the diversity scheme or the precoder matrix applied after the diversity scheme. After precoding and application of the small delay CDD, the signal from the four antennas (Ant 0, Ant 1, Ant 2, Ant 3) is shown in Table 2.

TABLE 2

| | Tone 0 | Tone 1 | Tone 2 | Tone 3 |
|---|---|---|---|---|
| Ant 0 | $g_0 x_0$ | $g_0 x_1$ | $g_0 x_2$ | $g_0 x_3$ |
| Ant 1 | $g_1 x_0$ | $g_1 x_1$ | $g_1 x_2$ | $g_1 x_3$ |
| Ant 2 | $g_2 x_0$ | $g_2 x_1 e^{j\theta}$ | $g_2 x_2 e^{2j\theta}$ | $g_2 x_3 e^{3j\theta}$ |
| Ant 3 | $g_3 x_0$ | $g_3 x_1 e^{j\theta}$ | $g_3 x_2 e^{2j\theta}$ | $g_3 x_3 e^{3j\theta}$ |

In this example, the parameters $g_0, g_1, g_2, g_3$ correspond to the different pre-coder coefficients (e.g., $[g_0\ g_1]$ is the precoder used for antenna 0 and antenna 1, and $[g_2 g_3]$ is the precoder used for antenna 2 and antenna 3), e corresponds to the base of the exponential function, e.g., Euler's number, j corresponds to the square root of −1 (i.e., the imaginary unit), and θ corresponds to a phase shift applied in the small delay CDD. Thus, the signal in one antenna will have a small phase shift in the frequency domain, $e^{j\theta}$, relative to a signal of another antenna in the frequency domain. A phase shift applied in the frequency domain is equivalent to a cyclic shift applied in a time domain.

In another example, in which the small delay CDD is applied prior to the precoder for a given data stream $x_0, x_1, x_2, \ldots$, the UE may apply SCDD as follows:

Ant 0: $x_0, x_1, x_2, \ldots$,
Ant 1: $x_0, x_1, x_2, \ldots$,
Ant 2: $x_0, x_1 e^{j\theta}, x_2 e^{2j\theta}, \ldots$
Ant 3: $x_0, x_1 e^{j\theta}, x_2 e^{2j\theta}, \ldots$ Then, the precoder matrix may be applied to the data stream having the diversity scheme already applied.

The UE may apply the change in power control or the codebook that allows for simultaneous transmission from non-coherent antenna ports for different numbers and/or types of antenna ports. As illustrated at 807, the UE may determine at least one antenna port having non-zero data for transmission. The determination at 807 may be based on a precoder indicated to the UE by the base station 804, e.g., via downlink control signaling 801. When the UE determines multiple antenna ports having the non-zero data for transmission, at 819, the UE may split the transmission power, e.g., P among the multiple antenna ports without scaling the transmission power. In an example, the UE may limit simultaneous transmission to coherent antenna ports. In an example when the UE determines that the at least one antenna port includes determining multiple, non-coherent antenna ports having the non-zero data for transmission, at 809, the UE may split the transmission power, P, across the multiple, non-coherent antenna ports having the non-zero data for transmission.

The UE may also apply precoding for the data transmission, at 811, based on a codebook for simultaneous transmission from the multiple, non-coherent antenna ports. At 813, the UE may further apply a diversity scheme among the first set of coherent antenna ports and the second set of coherent antenna ports. The at least one antenna port having the non-zero data for transmission may be determined based at least in part on a precoder indicated to the UE by the base station. In an example, a single antenna port may be determined as having the non-zero data for transmission, and the data transmission is transmitted from the single antenna port using the transmission power, P, determined by the UE.

As illustrated at 815, the UE may transmit the PUSCH to the base station 804 using the antenna port(s) after the PUSCH baseband signal is generated.

Figure 9:
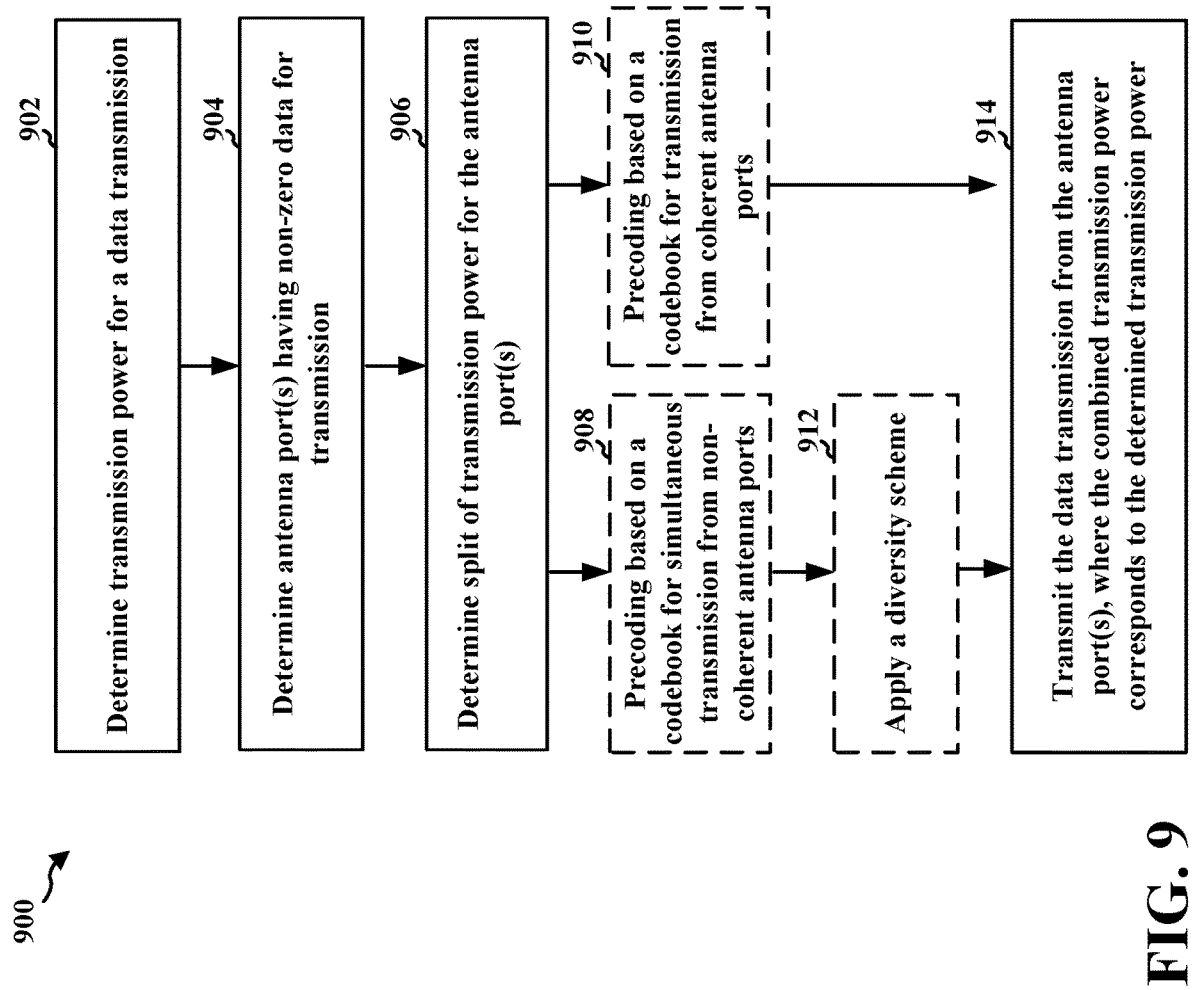
FIG. 9 is a flowchart of a method of wireless communication.

FIG. 9 is a flowchart 900 of a method of wireless communication. The method may be performed by a UE (e.g., UE 104, 350, 802; the apparatus 1002, 1002'; the processing system 1114, which may include the memory 360 and which may be the entire UE 350 or a component of the UE 350, such as the TX processor 368, the RX processor 356, and/or the controller/processor 359) in wireless communication with a base station (e.g., base station 102, 180, 310, 804, 1050). The UE may have a first antenna port that is non-coherent to a second antenna port, e.g., such as described in connection with FIGS. 4 and 5. As in FIG. 5, the UE may comprise partial coherent antenna ports, e.g., with the first antenna port comprised in a first set of coherent antenna ports and the second antenna port comprised in a second set of coherent antenna ports, wherein the first set of coherent antenna ports is non-coherent to the second set of coherent antenna ports.

At 902, the UE determines a transmission power for a data transmission from the UE to a base station based at least in part on power control signaling from the base station. For example, transmission power component 1008 of apparatus 1002 may determine the transmission power. The transmission power, P, may be determined to be a minimum of a maximum power that the UE can transmit, e.g. $P_{max}$, and a second transmission power scheduled by the base station, e.g., $P_{schedule}$, via power control signaling. This determination may be expressed as, e.g., P=min $\{P_{max}, P_{schedule}\}$. Thus, the transmission power is a power level without power scaling by the UE to reduce the transmission power.

At 904, the UE determines antenna port(s) having non-zero data for transmission. For example, antenna port component 1010 of apparatus 1002 may determine the antenna ports having non-zero data for transmission. For example, the UE may determine antenna port(s) having non-zero PUSCH for transmission. The determination of the antenna ports may be based, at least in part, on a precoder indicated to the UE by the base station. The precoder may be indicated to the UE in downlink control signaling, e.g., in DCI. The UE may take different actions, e.g., depending on the determined number of antenna ports. Then, at 906, the UE may determine a transmission power split for the at least one antenna port.

In one example, the UE may determine multiple antenna ports having the non-zero data for transmission, at 904. The multiple antenna ports may be coherent antenna ports. As an example, the UE may determine coherent antenna ports without any non-coherent antenna ports being determined as having non-zero data for transmission. In this example, determining the transmission power split, at 906 may include splitting the transmission power among the multiple antenna ports without scaling the transmission power. For example, split component 1012 of apparatus 1002 may split the transmission power. In an example, precoding may be applied, at 910, e.g., based on a codebook that limits simultaneous data transmission to coherent antennas. For example, precoder component 1014 of apparatus 1002 may apply the precoding. Thus, for two antenna ports having non-zero data for transmission, the transmission power determined at 902 may be split equally between the two coherent antennas, each antenna transmitting using ½ the full transmission power.

In a second example, the UE may determine multiple, non-coherent antenna ports as having the non-zero data for transmission. In this example, the transmission power may be split, at 906, across the multiple, non-coherent antenna ports having the non-zero data for transmission. For example, split component 1012 of apparatus 1002 may split the transmission power. In this example, the UE may precode the data transmission, at 908, based on a codebook for simultaneous transmission from the multiple, non-coherent antenna ports. For example, precoder component 1014 of apparatus 1002 may apply the precoding. The UE may further apply a diversity scheme, at 912, among the first set of coherent antenna ports and the second set of coherent antenna ports. For example, diversity scheme component 1016 of apparatus 1002 may apply the diversity scheme. The use of such schemes among non-coherent sets of antennas provides diversity even when phase coherence is not able to be maintained between the sets of antennas. In one example, the diversity scheme may comprise an open-loop, non-transparent diversity scheme. Among others, examples of open-loop, non-transparent diversity scheme may include SFBC, STBC, etc. In another example, the diversity scheme may comprise a transparent diversity scheme. Among others, an example transparent diversity scheme may include a small delay CDD.

At 914, the UE transmits the data transmission from the at least one antenna port. For example, transmission component 1006 of apparatus 1002 may transmit the data. The combined transmission power from the one antenna port(s) for the data transmission corresponds to the transmission power determined based at least in part on the power control signaled from the base station, e.g., the full transmission power without scaling by the UE to reduce the transmission power.

In one example, a single antenna port may be determined, at 904, as having the non-zero data for transmission. In this example, the data transmission, at 914, may be transmitted from the single antenna port using the full transmission power determined by the UE, at 902.

Figure 10:
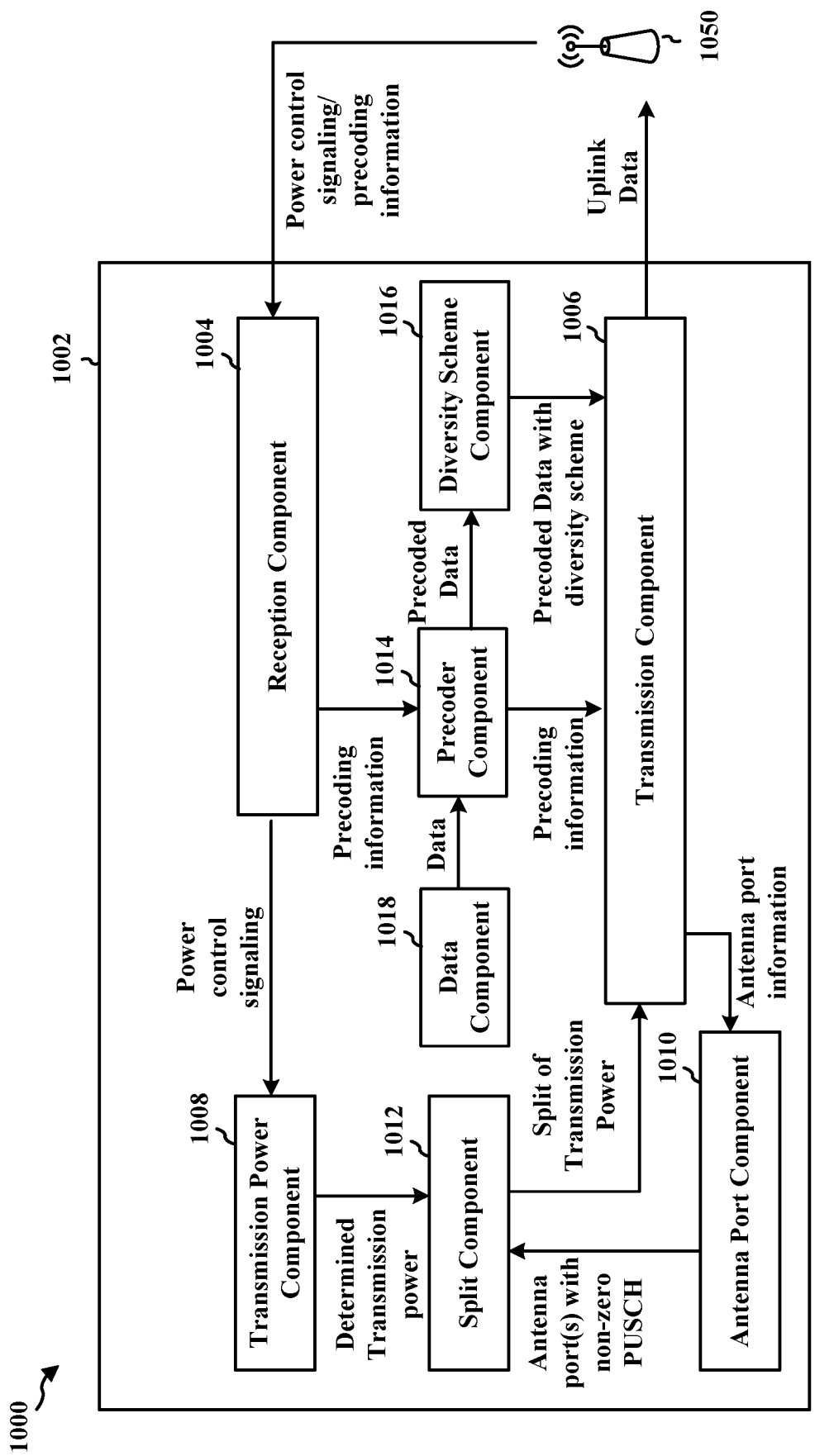
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE or a component of a UE (e.g., UE 104, 350, 802). The apparatus includes a reception component 1004 that receives downlink communication from base station 1050 (e.g., base station 102, 180, 310, 804) and a transmission component 1006 that transmits uplink communication to the base station 1050. The apparatus may include a transmission power component 1008 for determining a transmission power for a data transmission from the UE to a base station based at least in part on power control signaling from the base station. The apparatus may include an antenna port component 1010 for determining at least one antenna port having non-zero data for transmission. The apparatus may include a split component 1012 for determining a transmission power split for the at least one antenna port. The apparatus may include a data component 1018 for transmitting the data transmission from the at least one antenna port, via the transmission component 1006, wherein a combined transmission power from the at least one antenna port corresponds to the transmission power determined by the transmission power component 1008 based at least in part on the power control signaled from the base station. The apparatus may further include a precoder component 1014 for precoding the data transmission based on a codebook for simultaneous transmission from the multiple, non-coherent antenna ports. The apparatus may include a diversity scheme component 1016 for applying a diversity scheme (e.g., an open-loop diversity scheme and/or a transparent diversity scheme) among the first set of coherent antenna ports and the second set of coherent antenna ports.

The transmission power component 1008 may determine the transmission power to be a minimum of a maximum power that the UE can transmit and a second transmission power scheduled by the base station via the power control signaling. The antenna port component 1010 may determine the at least one antenna port based at least in part on a precoder indicated to the UE by the base station. The antenna port component 1010 may determine multiple, coherent antenna ports having the non-zero data for transmission, and the split component 1012 may split the transmission power among the multiple, coherent antenna ports without scaling the transmission power. The antenna port component 1010 may determine multiple, non-coherent antenna ports having the non-zero data for transmission, and the split component 1012 may split the transmission power across the multiple, non-coherent antenna ports having the non-zero data for transmission.

The apparatus may include additional components that perform each of the blocks of the algorithm in the aforementioned flowcharts of FIGS. 6A, 6B, 8, and 9. As such, each block in the aforementioned flowcharts of FIGS. 6A, 6B, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
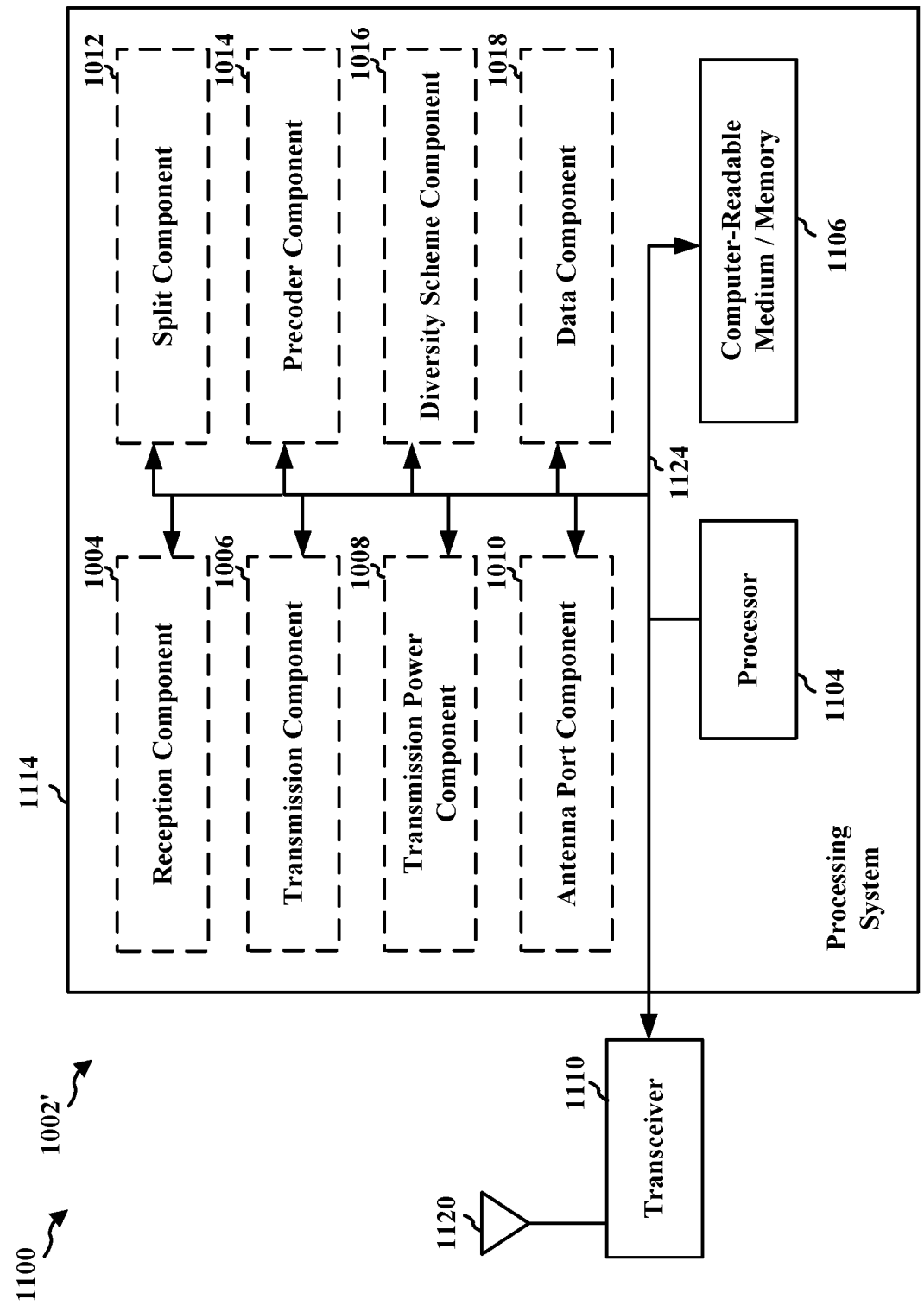
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for determining a transmission power for a data transmission from the UE to a base station based at least in part on power control signaling from the base station. The apparatus may include means for determining at least one antenna port having non-zero data for transmission. The apparatus may include means for determining a transmission power split for the at least one antenna port and means for transmitting the data transmission from the at least one antenna port, wherein a combined transmission power from the at least one antenna port corresponds to the transmission power determined based at least in part on the power control signaled from the base station. The apparatus may further include means for precoding the data transmission based on a codebook for simultaneous transmission from the multiple, non-coherent antenna ports. The apparatus may include means for applying a diversity scheme (e.g., an open-loop diversity scheme and/or a transparent diversity scheme) among the first set of coherent antenna ports and the second set of coherent antenna ports. The means for determining the transmission power may determine the transmission power to be a minimum of a maximum power that the UE can transmit and a second transmission power scheduled by the base station via the power control signaling. The means for determining the at least one antenna port having the non-zero data for transmission may determine the at least one antenna port based at least in part on a precoder indicated to the UE by the base station. The means for determining the at least one antenna port may determine multiple, coherent antenna ports having the non-zero data for transmission, and the means for determining the transmission power split may split the transmission power among the multiple, coherent antenna ports without scaling the transmission power. The means for determining the at least one antenna port may determine multiple, non-coherent antenna ports having the non-zero data for transmission, and the transmission power may be split across the multiple, non-coherent antenna ports having the non-zero data for transmission.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    determining a full transmission power for a data transmission from partially coherent antenna sets to a base station based at least in part on a power control signaling from the base station, wherein the partially coherent antenna sets comprise a first set of coherent antenna ports that is non-coherent to a second set of coherent antenna ports based on a relative phase difference of transmitted uplink signals between the first set of coherent antenna ports and the second set of coherent antenna ports;
    determining multiple antenna ports in the partially coherent antenna sets having non-zero data for transmission;
    determining a transmission power split of the full transmission power determined with the power control signaling by splitting the full transmission power equally across each of the multiple antenna ports on which the UE transmits the data transmission with non-zero power; and
    transmitting the data transmission from the multiple antenna ports based on a diversity scheme across the partially coherent antenna sets, wherein the diversity scheme comprises an open-loop non-transparent diversity scheme that includes a selected coding between space-frequency block coding and space-time block coding, wherein a combined transmission power from the multiple antenna ports corresponds to the full transmission power determined based at least in part on the power control signaling from the base station.

2. The method of claim 1, wherein the full transmission power is determined to correspond to a minimum of a maximum output power that the UE is configured to transmit and a second transmission power scheduled by the base station via the power control signaling.

3. The method of claim 1, further comprising:
    receiving, from the base station, an indication of a precoder,
    wherein the determining the multiple antenna ports comprises determining the multiple antenna ports in the partially coherent antenna sets having the non-zero data for transmission based at least in part on the indication of the precoder.

4. The method of claim 1, wherein the determining the multiple antenna ports comprises determining multiple, non-coherent antenna ports in the partially coherent antenna sets having the non-zero data for transmission.

5. The method of claim 4, wherein the determining the transmission power split comprises splitting the full transmission power equally across the multiple, non-coherent antenna ports having the non-zero data for transmission.

6. The method of claim 4, further comprising:
precoding the data transmission based on a codebook for simultaneous transmission from the multiple, non-coherent antenna ports.

7. The method of claim 1, further comprising:
determining whether the first set of coherent antenna ports and the second set of coherent antenna ports maintain the relative phase difference between each other over time;
determining that the first set of coherent antenna ports is non-coherent to the second set of coherent antenna ports when the first set of coherent antenna ports and the second set of coherent antenna ports do not maintain the relative phase difference between each other over time; and
applying the diversity scheme to the first set of coherent antenna ports and the second set of coherent antenna ports.

8. An apparatus for wireless communication at a User Equipment (UE), comprising:
means for determining a full transmission power for a data transmission from partially coherent antenna sets to a base station based at least in part on a power control signaling from the base station, wherein the partially coherent antenna sets comprise a first set of coherent antenna ports that is non-coherent to a second set of coherent antenna ports based on a relative phase difference of transmitted uplink signals between the first set of coherent antenna ports and the second set of coherent antenna ports;
means for determining multiple antenna ports in the partially coherent antenna sets having non-zero data for transmission;
means for determining a transmission power split of the full transmission power determined with the power control signaling by splitting the full transmission power equally across each of the multiple antenna ports on which the UE transmits the data transmission with non-zero power; and
means for transmitting the data transmission from the multiple antenna ports based on a diversity scheme across the partially coherent antenna sets, wherein the diversity scheme comprises an open-loop non-transparent diversity scheme that includes a selected coding between space-frequency block coding and space-time block coding, wherein a combined transmission power from the multiple antenna ports corresponds to the full transmission power determined based at least in part on the power control signaling from the base station.

9. The apparatus of claim 8, wherein the means for determining the multiple antenna ports is configured to determine multiple, non-coherent antenna ports having the non-zero data for transmission, the apparatus further comprising:
means for precoding the data transmission based on a codebook for simultaneous transmission from the multiple, non-coherent antenna ports.

10. The apparatus of claim 8, further comprising:
means for determining whether the first set of coherent antenna ports and the second set of coherent antenna ports maintain the relative phase difference between each other over time;
means for determining that the first set of coherent antenna ports is non-coherent to the second set of coherent antenna ports when the first set of coherent antenna ports and the second set of coherent antenna ports do not maintain the relative phase difference between each other over time; and
means for applying the diversity scheme to the first set of coherent antenna ports and the second set of coherent antenna ports.

11. An apparatus for wireless communication at a User Equipment (UE), comprising:
a memory; and
at least one processor coupled to the memory and configured to:
determine a full transmission power for a data transmission from partially coherent antenna sets to a base station based at least in part on a power control signaling from the base station, wherein the partially coherent antenna sets comprise a first set of coherent antenna ports that is non-coherent to a second set of coherent antenna ports based on a relative phase difference of transmitted uplink signals between the first set of coherent antenna ports and the second set of coherent antenna ports;
determine multiple antenna ports in the partially coherent antenna sets having non-zero data for transmission;
determine a transmission power split of the full transmission power determined with the power control signaling by splitting the full transmission power equally across each of the multiple antenna ports on which the UE transmits the data transmission with non-zero power; and
transmit the data transmission from the multiple antenna ports based on a diversity scheme, wherein the diversity scheme comprises an open-loop non-transparent diversity scheme that includes a selected coding between space-frequency block coding and space-time block coding, wherein a combined transmission power from the multiple antenna ports corresponds to the full transmission power determined based at least in part on the power control signaling from the base station.

12. The apparatus of claim 11, wherein the full transmission power is determined to correspond to a minimum of a maximum output power that the UE is configured to transmit and a second transmission power scheduled by the base station via the power control signaling.

13. The apparatus of claim 11, wherein the at least one processor is further configured to:
receive, from the base station, an indication of a precoder,
determine the multiple antenna ports in the partially coherent antenna sets having the non-zero data for transmission based at least in part on the indication of the precoder, and
determine multiple, non-coherent antenna ports in the partially coherent antenna sets having the non-zero data for transmission.

14. The apparatus of claim 13, wherein the at least one processor is further configured to split the full transmission power across the multiple, non-coherent antenna ports having the non-zero data for transmission.

15. The apparatus of claim 13, wherein the at least one processor is further configured to:
    precode the data transmission based on a codebook for simultaneous transmission from the multiple, non-coherent antenna ports.

16. The apparatus of claim 13, wherein the at least one processor is further configured to:
    determine whether the first set of coherent antenna ports and the second set of coherent antenna ports maintain the relative phase difference between each other over time,
    determine that the first set of coherent antenna ports is non-coherent to the second set of coherent antenna ports when the first set of coherent antenna ports and the second set of coherent antenna ports do not maintain the relative phase difference between each other over time, and
    apply the diversity scheme to the first set of coherent antenna ports and the second set of coherent antenna ports.

17. A non-transitory computer-readable medium storing computer executable code for wireless communication at a User Equipment (UE), the code when executed by at least one processor, causes the UE to:
    determine a full transmission power for a data transmission from partially coherent antenna sets to a base station based at least in part on a power control signaling from the base station, wherein the partially coherent antenna sets comprise a first set of coherent antenna ports that is non-coherent to a second set of coherent antenna ports based on a relative phase difference of transmitted uplink signals between the first set of coherent antenna ports and the second set of coherent antenna ports;
    determine multiple antenna ports in the partially coherent antenna sets having non-zero data for transmission;
    determine a transmission power split of the full transmission power determined with the power control signaling by splitting the full transmission power equally across each of the multiple antenna ports on which the UE transmits the data transmission with non-zero power; and
    transmit the data transmission from the multiple antenna ports based on a diversity scheme, wherein the diversity scheme comprises an open-loop non-transparent diversity scheme that includes a selected coding between space-frequency block coding and space-time block coding, wherein a combined transmission power from the multiple antenna ports corresponds to the full transmission power determined based at least in part on the power control signaling from the base station.

* * * * *